United States Patent [19]

Glorioso

[11] Patent Number: 4,989,344
[45] Date of Patent: * Feb. 5, 1991

[54] PARTICULATE REMOVAL FOR A SLUDGE TREATMENT PROCESS

[75] Inventor: John D. Glorioso, Clearwater, Fla.

[73] Assignee: Enviro-Gro Technologies, Baltimore, Md.

[*] Notice: The portion of the term of this patent subsequent to Aug. 9, 2005 has been disclaimed.

[21] Appl. No.: 228,864

[22] Filed: Aug. 4, 1988

Related U.S. Application Data

[63] Continuation-in-part of Ser. No. 924,630, Oct. 29, 1986, Pat. No. 4,761,893, and a continuation-in-part of Ser. No. 220,207, Jul. 18, 1988, Pat. No. 4,860,671.

[51] Int. Cl.$^5$ ............................................. F26B 3/24
[52] U.S. Cl. .......................................... 34/11; 34/35; 34/86; 34/102; 432/215
[58] Field of Search ................... 34/11, 35, 102, 9, 95; 432/197, 215

[56] References Cited

U.S. PATENT DOCUMENTS 2,090,187  8/1937  Credo ...................................... 34/11
2,102,427  12/1937  Lloyd et al. ........................... 34/11

*Primary Examiner*—Henry A. Bennet
*Attorney, Agent, or Firm*—Lowe, Price, LeBlanc, Becker & Shur

[57] ABSTRACT

A system is described for producing small uniform pellets of predetermined size which are substantially free of fines from mechanically dewatered sewage sludge and a means for controlling odor from the production of said pellets. The system includes a process and apparatus for mixing the dewatered sludge with previously dried recycled particles of said sludge. Drying the mixture in a thermal drier, separating a substantial portion of the dried solids from the drier off-gas. Clarifying said separated solids to separate the pellets of predetermined size, oversized pellets, and undersized pellets and particles, mechanically crushing the oversized pellets and admixing the crushed oversized pellets with the undersized pellets and particles and recycling said mixture for mixture with incoming dewatered sludge to the drier. The off-gas from the mechanical separation process is then passed through a two stage, in series, high pressure cyclone system to remove substantially all of the fines therefrom, without using a wet scrubber. The off-gas is then treated to remove odors and exhausted to the atmosphere.

15 Claims, 1 Drawing Sheet

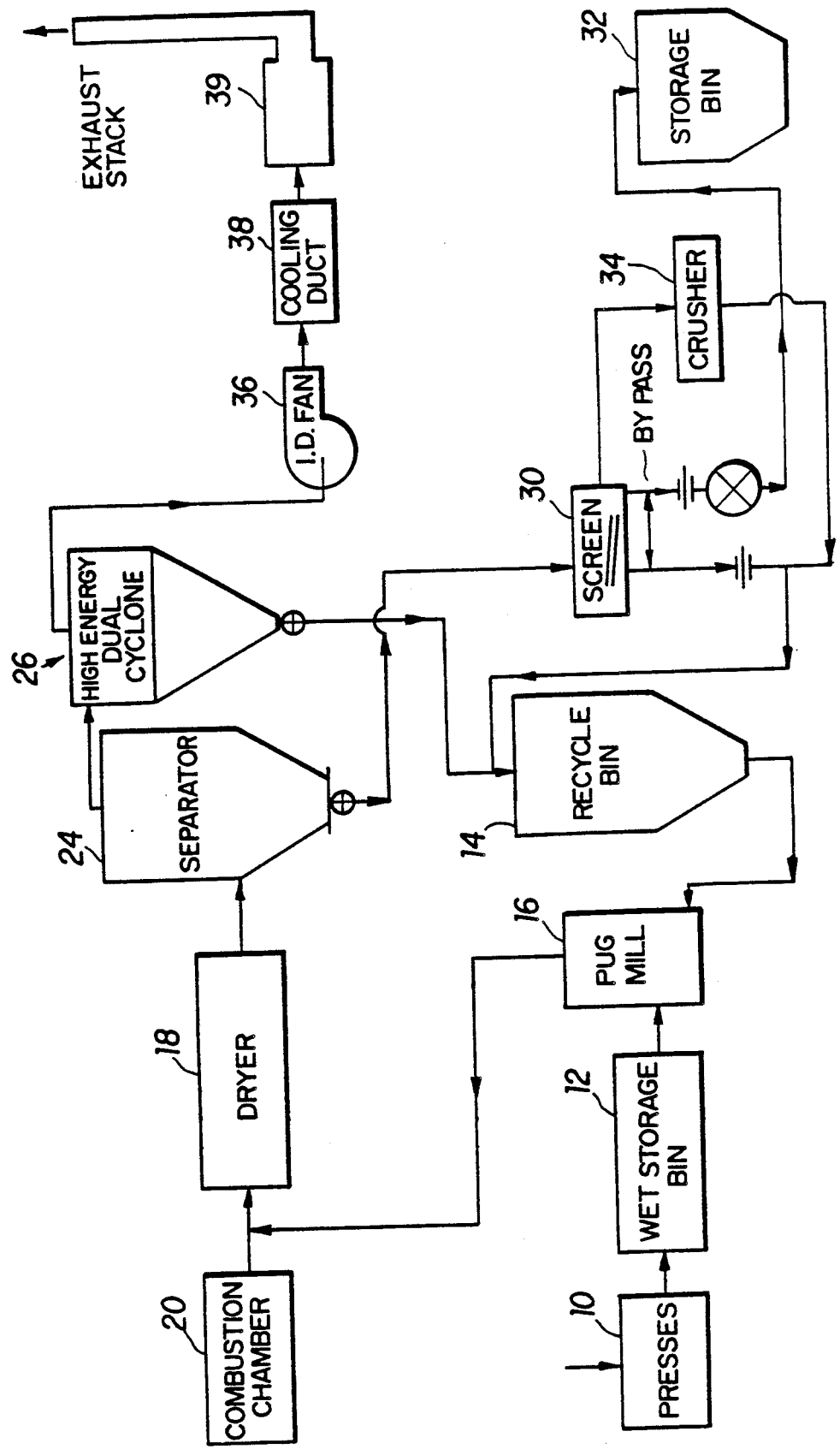

PARTICULATE REMOVAL FOR A SLUDGE TREATMENT PROCESS

This application is a continuation-in-part of my patent application entitled IMPROVED SLUDGE TREATMENT PROCESS, Ser. No. 924,630 filed Oct. 29, 1986, now U.S. Pat. No. 4,761,893 and Improved Odor Control for Sludge Treatment Process, Ser. No. 220,207, filed July 18, 1988 now U.S. Pat. No. 4,860,671, the disclosures of which are hereby incorporated by reference.

BACKGROUND

In my above identified parent patent application there is described a process for pelletizing sewage sludge to produce a product having pellets of uniform size which can be burned or used as a soil conditioner. In the latter case, uniform size pellets are very important so that the pellets may be used in conventional spreading equipment. The product produced by the parent process is essentially free of fines and free of oversized particles.

In the parent process, the sewage sludge is dewatered to produce a wet sludge cake. Previously pelletized particles and fines are then admixed with the wet sludge cake in a pug mill and the mixture passed through a dryer. The output from the dryer then proceeds to a separator can wherein solids are separated from the off-gas. The solids are then conveyed to a clarifier which separates undersized particles, which are routed to a recycle storage bin, product size pellets which are conveyed to a product storage bin for shipment or sale and oversized particles are routed to a crusher. The crushed particles are combined with the fines in a recycle bin for recycling.

The off-gas from the dryer and solid gas separator contains fines and some malodorous gases from the drying process. Typically the off-gas is passed through cyclones to remove most of the fines. The gas is then typically conveyed through a wet scrubber to further remove fines and then a packed tower and a chemical tower to remove the undesirable odors before being exhausted to the atmosphere. The gas treatment is mandated by federal and local emission requirements.

In my parent application Ser. No. 924,630, the off-gas from the dryer is initially passed through a cyclone for removal of most of the entrained solids. The gas then goes through a low pressure (3 inch) cyclone to remove most of the remaining solids prior to entering the wet scrubber. The off-gas from this cyclone can then be passed through a wet scrubber to remove nearly all of the remaining solids not removed by the low pressure cyclone so that emission requirements for solids are met. It is then necessary to remove the malodorous gas in a chemical tower before the off-gas can be released into the atmosphere.

The wet scrubber, depending on the size of the facility, is a major capital expense and a large component of the operating cost of a pelletizing system. For example, in a sludge pelletizing system having a gas flow rate of about 28,000 cubic feet per minute the water requirement for the scrubber could be about 300 gallons per minute. Therefore, if the wet scrubber can be eliminated without raising particulate emission above acceptable levels a major savings would result.

In my prior U.S. Pat. application Ser. No. 220,207, filed July 18, 1988, it was proposed to eliminate the chemical tower and substitute an afterburner therefor. The output from the afterburner then was used to heat outside air for the dryer. In this case the chemical tower was eliminated and a portion of the heat generated in the afterburner recycled to the dryer.

SUMMARY OF THE INVENTION

It has now been discovered however that my parent process can be further modified by replacing the wet scrubber with at least a pair of, in series, high pressure cyclones. Off-gas from the dryer then passes through the low velocity separator can and then through preferably a two stage high pressure series of cyclones. The pressure drop across these cyclones is typically at least 15 inches. The resulting gas may then be routed to a chemical tower for odor removal and subsequent release to the atmosphere. Obviously, the chemical tower could also be removed and an afterburner used for odor removal as described in my above patent application.

Accordingly, it is an object of this invention to provide an improved system for sludge pelletizing wherein the sludge is initially pelletized in a dryer and the dryer off-gas treated for solids removal by routing it through, preferably, a two stage high pressure cyclone system to eliminate the wet scrubber and provide an exhaust which will meet emission requirements for solids content.

BRIEF DESCRIPTION OF THE DRAWINGS

These and other objects will become readily apparent with reference to the drawings and following description wherein:

FIG. 1 is a detailed schematic of the system of this invention.

DETAILED DESCRIPTION OF THE INVENTION

With attention to FIG. 1, liquid sewage sludge may contain up to 90–99% water. According to conventional techniques, the sludge is subject to flocculation whereby sludge particles agglomerate so that when the liquid sewage sludge enters a mechanical press 10. It can be dewatered down to about 80% water and then routed to a storage bin 12. The material from bin 12 will be identified hereinafter as wet sludge cake. As noted, this material contains about 80% water.

Wet sludge cake from storage bin 12 and dried sludge from recycle bin 14 are then routed by conveyor to pug mill 16. Wet sludge cake and dried sludge can individually be conveyed by auger or the like, but the mixture in the pug mill cannot. Accordingly, as soon as the product is mixed in the pug mill 16 it enters the dryer 18 wherein heat is supplied by a conventional furnace 20 or the like. As will be obvious to those skilled in the art, the furnace may be supplemented by burning wood chips, sludge pellets or the like.

Dryer 18 is a rotary dryer heated at the entrance to about 800° F. While several different types of rotary dryers could be utilized, it is preferred to use the rotary dryer described in U.S. Pat. No. 4,558,525, or a rotary dryer such as available from Baker-Ruhlman Mfg. Inc. of Watertown, Wis.

Pelletized sludge together with the dryer off-gas exit the dryer 18 and enter a separator can 24. The temperature of this stream is about 180° F. The separator can 24 is a vertically disposed cyclone type separator that uses gravity and centrifugal force to remove over 90% of the solids from the gas stream.

In my parent application off-gas from the separator can was routed through a cyclone and then through a wet scrubber for particulate removal. It has been discovered that a two stage, in series, high pressure cyclone system 26 can be substituted for this equipment and will remove particulates to an acceptable level for emissions to the atmosphere. Acceptable high pressure cyclones are available from Entrol of Huppauge, N.Y., and when installed in a drying system with a separator can, have removed solids at least to a concentration of 0.03 grains/DCFM with a pressure drop of at least about 15 inches.

Solids from cyclones 26 then are routed to the recycle bin 14. Off-gas from cyclones 26 is then treated conventionally to remove odors before being exhausted to the atmosphere.

Solids from separator 24 then enter a screen system 30. Preferably, screen system 30 is a rotary screen which also acts as a cooler. In the preferred embodiment of this invention ⅛ inch and 3/32 inch screens are provided. Material larger in diameter than ⅛ inch is classified as oversized. Particles in diameter between ⅛ inch and 3/32 inch are the product and are routed to product bin 32. The oversized particles are then routed to a conventional crusher 34 which may be a roller or the like. The crushed particles are then routed to recycle bin 14. The fines passing through the 3/32 inch screen then exit the screen and are also routed to the recycle bin 14. If more recycle material is needed, obviously product from product bin 32 can be utilized.

Finally, the air stream exhausted from cyclones 26 passes by a fan 36, and a cooling duct 38 and then to a chemical tower 39 for odor removal. Preferably tower 39 has two stages and is of conventional design. Such a system is obtainable from Duall Industries of Owosso, Mich.

During normal operation the product pellets have an optimum size of about ⅛ inch and constitute about 10% of the solids passing through the system.

As previously indicated the entrance temperature at the rotary dryer is about 800° F. The temperature of the air stream exiting the dryer is about 180° F. After cooling in the rotary cooler screen system 30 the recycle materials in the recycle bin are at a temperature of about 140°.

In summary then an expensive wet scrubber and low pressure cyclone installation have been eliminated and replaced by a two stage, in series, high pressure cyclone system.

The process of this invention then produces sludge pellets of uniform size for use as a soil conditioner and the like and produces by-product off-gases which may be released to the atmosphere without violating emission requirements.

The invention may be embodied in other specified forms without departing from the spirit or essential characteristics thereto. The present embodiments are therefore to be considered in all respects as illustrative and not restrictive, the scope of the invention being indicated by the appended claims rather than by the foregoing description, and all changes which may come within the meaning and range of equivalency of the claims are therefore intended to be embraced therein.

What is claimed is:

1. A process for drying mechanically dewatered sewage sludge to produce pellets of a predetermined small and uniform size comprising the steps of:

mixing said sludge with recycled, previously dried sludge particles and pellets;
   drying said mixture in a thermal drier to form pellets and particles thereof;
   conveying the dried pellets and particles and dryer off-gas to a low velocity gas/solids separator and separating and collecting the pellets and a substantial portion of the particles;
   clarifying the collected pellets and particles and separating and collecting the pellets of a predetermined size, the undersized pellets and particles, and the oversize pellets;
   mechanically crushing the oversized pellets and collecting the crushed pellets and undersized pellets and particles;
   recycling the collected undersized pellets and particles and crushed pellets by mixing said recycled materials with said incoming sludge to the dryer;
   providing a two stage high pressure cyclone system;
   collecting the off-gas from the gas/solids separator and removing substantially all of the fines therefrom by routing said gas successively through said high pressure cyclones.

2. The process of claim 1 further comprising removing the malodorous constituents of said off-gas for exhaust into the atmosphere.

3. The process of claim 1 wherein the thermal dryer is a rotary dryer.

4. The process of claim 3 wherein the entrance temperature at said dryer is about 800° F.

5. The process of claim 1 wherein the step of clarifying further comprises cooling said collected pellets and particles.

6. The process of claim 1 further comprising admixing said crushed oversized pellets, undersize pellets and particles, and fines for recycling with said mechanically dewatered sewage sludge.

7. The process of claim 1 wherein the step of separating further comprises separating over 90% of the solids in said separator exiting said dryer.

8. The process of claim 1 further comprising collecting the fines from said high pressure cyclones and combining said fines with the recycle materials.

9. An apparatus for drying mechanically dewatered sewage sludge to produce pellets of a predetermined small and uniform size comprising:

means for mixing said sludge with recycled, previously dried sludge particles and pellets;
   thermal drying means downstream of said mixing means for receiving said mixture and drying said mixture to form pellets and particles thereof;
   gas/solids separator means downstream of drying means for receiving the dried pellets and particles and off-gas and separating a substantial portion of said particles and pellets;
   clarifying means downstream of said separator for receiving said separated particles and pellets and separating the particles of predetermined size, the undersized pellets and particles, and the oversized pellets;
   mechanical crushing means downstream of said clarifying means for receiving and mechanically crushing the oversized pellets;
   storage bin means and conveying means for conveying the crushed oversized particles and undersized pellets and particles from the clarifying means into the storage bin means whereby the contents of said storage bin means may be recycled by mixing the same with incoming dewatered sludge to be admitted to said drying means;

a two stage, high pressure cyclone means coupled to said gas/solids separator means for receiving the off-gas therefrom and for separating substantially all remaining solids therefrom and conveying means for conveying said separated solids to said storage bin means for recycling;

10. The apparatus of claim 9 further comprising odor removal means downstream of said high pressure cyclone means for removing odors from said off-gas.

11. The apparatus of claim 9 wherein said thermal drying means includes a rotary dryer.

12. The apparatus of claim 9 wherein said clarifying means further comprises means for separating pellets between ⅛ inch and 3/32 inch in diameter, means for separating pellets and particles having diameters of less than 3/32 inch and means for separating oversize pellets having diameters of greater than ⅛ inch.

13. The apparatus of claim 9 wherein said clarifying means further includes cooling means for cooling said collected pellets and particles.

14. The apparatus of claim 9 wherein said thermal drying means provides an inlet temperature of about 800° F.

15. The apparatus of claim 9 wherein said clarifying means is adapted to separate and collect pellets of a diameter of about ⅛ inch.

* * * * *